United States Patent
Herbert et al.

(10) Patent No.: US 7,203,655 B2
(45) Date of Patent: Apr. 10, 2007

(54) METHOD AND SYSTEM FOR PROVIDING PERFORMANCE STATISTICS TO AGENTS

(75) Inventors: Meghan Herbert, Dallas, TX (US); Paul Harold Leamon, McKinney, TX (US)

(73) Assignee: IEX Corporation, Richardson, TX (US)

( * ) Notice: Subject to any disclaimer, the term of this patent is extended or adjusted under 35 U.S.C. 154(b) by 748 days.

(21) Appl. No.: 09/776,610

(22) Filed: Feb. 15, 2001

(65) Prior Publication Data

US 2001/0056367 A1 Dec. 27, 2001

Related U.S. Application Data

(60) Provisional application No. 60/182,988, filed on Feb. 16, 2000.

(51) Int. Cl.
G06Q 10/00 (2006.01)

(52) U.S. Cl. ............................................ 705/11
(58) Field of Classification Search ........... 709/223; 705/9, 11; 379/265, 265.11
See application file for complete search history.

(56) References Cited

U.S. PATENT DOCUMENTS

| | | | | |
|---|---|---|---|---|
| 5,134,574 A | * | 7/1992 | Beaverstock et al. | 702/84 |
| 5,185,780 A | * | 2/1993 | Leggett | 379/265.08 |
| 5,299,260 A | * | 3/1994 | Shaio | 379/266.07 |
| 5,325,292 A | * | 6/1994 | Crockett | 705/9 |
| 5,778,060 A | * | 7/1998 | Otto | 379/266.09 |
| 5,909,669 A | * | 6/1999 | Havens | 705/11 |
| 5,911,134 A | * | 6/1999 | Castonguay et al. | 705/9 |
| 5,926,794 A | * | 7/1999 | Fethe | 705/11 |
| 6,188,992 B1 | * | 2/2001 | French | 705/36 R |
| 6,249,715 B1 | * | 6/2001 | Yuri et al. | 700/111 |
| 6,324,274 B1 | * | 11/2001 | Akester et al. | 379/201.02 |
| 6,366,666 B2 | * | 4/2002 | Bengtson et al. | 379/265.06 |
| 6,381,640 B1 | * | 4/2002 | Beck et al. | 709/223 |
| 6,404,883 B1 | * | 6/2002 | Hartmeier | 379/265.03 |
| 6,584,192 B1 | * | 6/2003 | Agusta | 379/265.12 |
| 6,614,903 B1 | * | 9/2003 | Flockhart et al. | 379/265.12 |
| 6,636,598 B1 | * | 10/2003 | Thomson et al. | 379/265.05 |
| 6,744,877 B1 | * | 6/2004 | Edwards | 379/265.02 |
| 6,959,078 B1 | * | 10/2005 | Eilbacher et al. | 379/265.03 |

(Continued)

FOREIGN PATENT DOCUMENTS

EP 949794 A1 * 10/1999

(Continued)

OTHER PUBLICATIONS webarchive.org webpage of Dec. 6, 1998, genesys.com, "Products & Services: Call Center Reporting", pp. 1-3.*

(Continued)

*Primary Examiner*—Tariq Hafiz
*Assistant Examiner*—Jonathan G Sterrett
(74) *Attorney, Agent, or Firm*—David H. Judson

(57) ABSTRACT

A method and a system for providing and presenting performance statistics to an agent. A further embodiment of the present invention provides performance comparison reporting between an agent and an agent data group and/or a management unit. This is achieved by collecting and calculating statistical parameters that characterize the performance of agents, providing periodic updates to the performance data, and providing access to the performance data to the agent.

16 Claims, 7 Drawing Sheets

U.S. PATENT DOCUMENTS

2002/0067822 A1* 6/2002 Cohen et al. .......... 379/265.12

FOREIGN PATENT DOCUMENTS

JP          04223560 A  *  8/1992

OTHER PUBLICATIONS webarchive.org webpage of Dec. 5, 1998, genesys.com, "Products & Services: Genesys DART", pp. 1-3.*
Business Wire, Jun. 22, 1998, "New Expectations Software Wins Best of CTI Expo Designation".*
Business Wire, Jun. 1, 1998, "Clarify xPECT: Clafiy and xPECT partner to Improve Call Center Performance".*
webarchive.org webpage of Feb. 2, 1999, www.xpecttech.com/xprod.shtml, xPECT Technologies one day seminar on Expectations™ software, pp. 1-2.*
"Help Desk Software Roundup", Apr. 1998, Telemarketing and Call Center Solutions, v16n10, pp. 70-85, section on Applix inc.*
Business Wire, Jul. 17, 1998, "Stancil to sell xPECT Products".*
webarchive.org webpage of Jul. 7, 1997, www.iex.com/products/ccp/, "IEX Corporation: Call Center Products", pp. 1-2.*
"Genesys Products—Call Concentrator", web.archive.org webpage of Genesyslab.com, Nov. 5, 1996, pp. 1-2.*
"Genesys Products—Campaign Manager", web.archive.org webpage of Genesyslab.com, Nov. 5, 1996, pp. 1-2.*
"Genesys Products—Products & Services DART", web.archive.org webpage of Genesyslab.com, Jun. 26, 1997, pp. 1-3.*
"Genesys Products—Products & Services DART Diagram", web.archive.org webpage of Genesyslab.com, Jun. 26, 1997, p. 1.*
"Desktop Solutions", web.archive.org webpage of Genesyslab.com, Nov. 5, 1996, pp. 1-2.*
"Genesys Products—Products & Services Application Products", web.archive.org webpage of Genesyslab.com, Jun. 26, 1997, pp. 1-2.*
Jooss, Ron, "Raising the Bar", Jan. 1999, Credit Union Management, 22, 1; ABI/INFORM Global, p. 44.*
"Genesys Products—Call Router", web.archive.org webpage of Genesyslab.com, Nov. 5, 1996, pp. 1-2.*
Jacobson, Tom, "Reaching New Heights", Jun. 1999, Credit Union Management, vol. 22, Iss. 6, p. 50, 4 pages, ProQuest ID 42071489.*
"Genesys—Industry & Solutions (Bell Mobility)", web.archive.org webpage of Genesyslab.com, Jun. 26, 1997, pp. 1-2.*
"Genesys—Press Center (Video ACD Press Release)", web.archive.org webpage of Genesyslab.com, Nov. 5, 1996, pp. 1-2.*
Genesys—Corporate Overview, web.archive.org webpage of Genesyslab.com, Nov. 5, 1996, pp. 1-2.*
"Genesys Products—Telephony Server (T-Server)", web.archive.org webpage of Genesyslab.com, Nov. 5, 1996, pp. 1-2.*
"Genesys Products—Internet Telephony", web.archive.org webpage of Genesyslab.com, Nov. 5, 1996, pp. 1-3.*
"Genesys Products—Video ACD", web.archive.org webpage of Genesyslab.com, Nov. 5, 1996, pp. 1-3.*
Mandaro, Tony; Wilson, Steve, "Looking and Leaping into Action", May 1999, Teleprofessional, Del Mar; vol. 12, Iss. 5, p. 54, ProQuest ID 42485079.*
Sterns, Nathan, "How Workforce Management Improves Call Handling Efficiency", Mar. 1998, Telemarketing and Call Center Solutions, vol. 16, Iss 9, ABI/INFORM Global, p. 124, ProQuest ID 33178826.*
Pruntly, Marty, "The Internet Call Center—is it in your future", Nov. 1998, Business Communications Review, p. 5, ProQuest ID 36605988.*
Vartabedian, Matthew, "A little of this, and a pinch of that", Oct. 1998, Call Center Solutions, vol. 17, Iss 4, p. 46, ProQuest ID 39603928.*
Jordan, Brad, "Skills-base routing: and industry survey", Feb. 1997, Telemarketing & Call Center Solutions, vol. 15, Iss 8, p. 134, ProQuest ID 11267977.*
"TotalView—analysis and reporting", web.archive.org webpage of IEX.com, May 30, 1998, pp. 1-2, web.archive.org/web/19980530032330/www.iex.com/products/ccp/ttlview/REPORTIN.htm.*
Frieseh, Brandon; Jainschigg, John; "Business Neurology 101", Jun. 1999, Computer Telephony, San Francisco, vol. 7, Iss. 6, p. 58, ProQuest ID 42275473.*
Leamon, Paul; "Workforce Management with skills-based routing: The New Challenge", Mar. 1999, Call Center Solutions, 17, 9; ABI/INFORM Global, p. 88-93.*
Business Editors/High Tech Writers CTI Expo Fall 99, "IEX Call Center Products Garner Product of the Year Honors from Industry Publications", Dec. 8, 1999, p. 1, ProQuest ID 46983010.*
"TotalView—Advantages", web.archive.org webpage of IEX.com, May 30, 1998, pp. 1-2, web.archive.org/web/19980530032401/www.iex.com/products/ccp/ttlview/advantag.htm.*
"Paul Leamon Article", web.archive.org webpage of IEX.com, Feb. 2, 1999, pp. 1-5, web.archive.org/web/19990202025717/www.iex.com/paulskill.htm.*
"Workforce Management", web.archive.org webpage of IEX.com, May 8, 1999, pp. 1-7, web.archive.org/web/19990508063208/www.iex.com/support/workforc.htm.*
"IEX Corporation—Products", web.archive.org webpage of IEX.com, Feb. 3, 1999, p. 1, web.archive.org/web/19990203180809/www.iex.com/products/default.htm.*
"Article Listing", web.archive.org webpage of IEX.com, May 4, 1999, p. 1, web.archive.org/web/19990504013045/www.iex.com/Articles+-+SBU3/articlelist.htm.*
"Special to Telemarketing Magazine", web.archive.org webpage of IEX.com, May 8, 1999, pp. 1-3, web.archive.org/web/19990508061346/www.iex.com/support/special.htm.*
"TotalView—Real Time Adherence", web.archive.org webpage of IEX.com, May 30, 1998, pp. 1-3, web.archive.org/web/19980530032348/www.iex.com/realtime.htm.*
"TotalView—Scheduling", web.archive.org webpage of IEX.com, May 30, 1998, p. 1, web.archive.org/web/19980530032305/www.iex.com/products/ccp/ttlview/schedule.htm.*
"6.3.2 What are Variables Control Charts", NIST.gov article, available from www.itl.nist.gov/div898/handbook/pmc/section3/pmc32.htm, pp. 1-5.*
"Chapter 3 Part II Class Problem 2", Management and Accounting Web problem adapted from the textbook: Boot, JCG; Cox; EB; "Statistical Analysis for Managerial Decisions", 1970, McGraw-Hill, p. 549.*

* cited by examiner

METHOD AND SYSTEM FOR PROVIDING PERFORMANCE STATISTICS TO AGENTS

CLAIM OF PRIORITY

This application claims priority from U.S. Provisional Patent Application No. 60/182,988 entitled "METHOD AND SYSTEM FOR VIEWING PERSONAL CONTACT STATISTICS IN A CONTACT CENTER ENVIRONMENT" filed on behalf of Meghan Herbert and Paul H. Leamon, on Feb. 16, 2000.

TECHNICAL FIELD

The invention relates generally to computerized methods and systems for providing performance statistics and, more particularly, to providing methods and systems for providing performance statistics to agents in an environment comprising one or more teams of agents.

BACKGROUND

In a work environment, such as a multimedia contact center, comprising one or more teams of agents, it is desirable to allow the individual agents to track their own performance and compare their performance with the performance of their peers. By comparing the performance of an agent with the performance of one or more peer groups, the agent is better able to determine areas requiring improvement. Furthermore, the comparison allows the individual agents to set and monitor personal goals, such as maintaining or exceeding the performance of a peer group, thereby improving job satisfaction.

Measuring agent performance, however, is laborious and is generally made with historical data. An agent, upon request, is usually given by their supervisor data concerning the activity of the agent, such as the amount of time worked and the number of contacts handled, such contacts including, for example, voice calls and other contacts, such as faxes, e-mail, voice mail, web requests, web call-back requests, web chats, web voice calls, web video calls, and the like. The supervisor typically calculates the desired performance statistics either by manual calculations or by entering the data into a spreadsheet, which then calculates the performance measurements from the entered data. Moreover, the supervisor typically compiles and calculates the same performance statistics for all of the agents within the peer group in order to compare the performance of the agent with the performance of the peer group. As a result, the availability of the performance measurements is often limited by the amount of time the supervisor has available to perform the calculations.

Moreover, even if a supervisor is willing to calculate the performance statistics for all members of a peer group, the supervisors generally do not have access to the data required to make a comparison to other groups. Generally, supervisors are not provided with performance data of another supervisor's agents. Therefore, while the supervisor may calculate his own group's performance, there is typically no means to compare his group's performance with another supervisor's group or multiple supervisor groups, including all supervisors at a contact center or across multiple contact centers.

Therefore, what is needed is a method and a system for providing performance information to an agent in a manner that is readily accessible by the agent, and for providing the agent with a performance comparison between the agent and the peer groups of the agent.

SUMMARY

The present invention provides a method and a system through which an agent may readily access comparison information between the individual agent and the peer groups of the agent. The method and system comprise obtaining information from one or more contact handling systems regarding the number and types of contacts for each agent and groups of agents. Reports are generated from the information and made available to the agents.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning automatic call distributors, multimedia servers, and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein are performed by a processor such as a computer or electronic data processor in accordance with code such as computer program code, software, or integrated circuits that are coded to perform such functions.

The principles of the present invention and their advantages are best understood by referring to the illustrated embodiment depicted in FIGS. 1–5.

Figure 1:
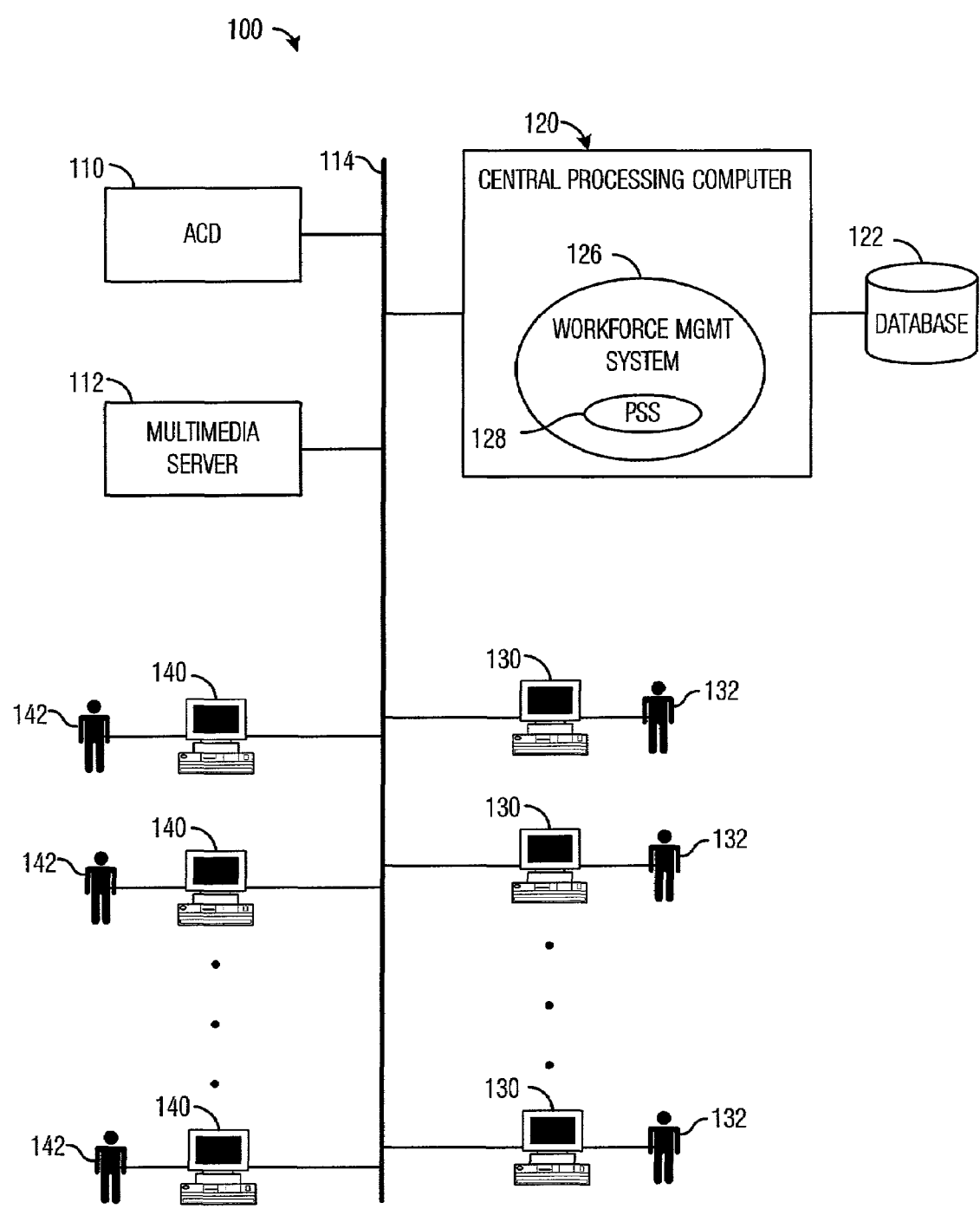
FIG. 1 schematically depicts a network environment that embodies features of the present invention.

Referring to FIG. 1 of the drawings, the reference numeral 100 generally designates one environment that embodies features of the present invention. The environment 100 is exemplified herein as a contact center environment, though it is understood that other types of environments, such as sales force environments, field service environments, manufacturing environments and other types of environments in which tasks are repeated and performance statistics are collected, may constitute the environment 100 as well, and the environment 100 is not limited to being a contact center environment.

The environment 100 generally comprises an automatic call distributor (ACD) 110 and a multimedia server 112 generally coupled to a central processing computer 120 via a network 114, such as a wireline and/or wireless local area network (LAN), a wireline and/or wireless wide area network (WAN), the Internet, an Intranet, or the like. The ACD 110 and multimedia server 112 generally provide routing capabilities for incoming voice calls (via the ACD) and other contacts (via the multimedia server), such as faxes, e-mail, voice mail, web requests, web call-back requests, web chats, web voice calls, web video calls, and the like. The function and operation of the ACD 110 and multimedia server 112 are considered to be well-known to a person having ordinary skill in the art and will, therefore, not be discussed in further detail herein, except to the extent necessary to disclose the present invention.

The central processing computer 120 receives from the ACD 110 and the multimedia server 112 periodic contact information, such as the number of contacts handled ("in contacts"), the amount of time an agent spends on incoming contacts ("talk time"), the amount of time an agent spends after the talk time for administrative duties related to contact resolution ("work time"), the amount of time an agent spends in talk time and work time ("total time"), the amount of time an agent spends available to take a call ("available time"), the amount of time an agent spends in an auxiliary state and/or is unable to take a call ("aux time" and/or "break time"), the number of outgoing contacts made by the agent ("out contacts"), the time spent on the outgoing contacts ("out time"), the elapsed time spent logged into the service system ("system time"), and the like, and preferably stores the information in a database 122 coupled to the central processing computer 120, preferably at 15–30 minute intervals or real-time. Optionally, other systems, such as a quality monitoring and recording system (not shown), a workforce management system 126 (discussed below), and the like, may be connected to the network 114 to provide additional data, such as a quality score, schedule adherence measurements, and the like. While the database 122 is shown external to the computer, one skilled in the art will appreciate that the database 122 may be included within the central processing computer 120, or that the data be retrieved when needed instead of storing. These variations, and others, are considered to be well known to one skilled in the art upon a reading of the present disclosure. The central processing computer 120 is also coupled via the network 114 to one or more agent workstations 130 and to one or more supervisor workstations 140, which provide an interface between the network 114 and one or more agents 132 and supervisors 142, respectively. The agent workstations 130 and the supervisor workstations 140 are preferably configured to access the central processing computer 120 through the network 114 via a browser, such as a JAVA-enabled web browser, an application, or a JAVA applet run without a web browser by using technologies such as the application WebStart available from Sun Microsystems, or the like. WebStart is preferred for providing access due to its ability to run different JAVA programs that require run different versions of JAVA.

Agents 132 access, via the telephone (not shown) and agent workstation 130, the ACD 110, multimedia server 112, or other contact servers (not shown) to aid in contact resolution. As the agents 132 service the contacts, the ACD 110 and the multimedia server 112 collect performance data for each of the agents 132. The performance data of the agents 132, such as the in contacts, talk time, work time, total time, available time, aux time, out contacts, out time, system time, and the like, are sent periodically by the ACD 110 and the multimedia server 112 to the central processing computer 120 and, preferably, stored in the database 122.

In one embodiment of the present invention, the central processing computer 120 preferably comprises a workforce management system (WMS) 126, such as TotalView™ Workforce Management available from IEX Corporation. The WMS 126 integrates many management functions, such as workforce forecasting and scheduling, skill planning and scheduling, multimedia contact management, real-time schedule adherence, and the like, and provides an interface to the database 122.

Preferably, the WMS 126 also comprises a performance statistics system (PSS) 128. In accordance with the present invention, the PSS 128 provides supervisors 142 and agents 132 reporting capabilities of performance statistics of individual agents and, preferably, performance comparison reports between individual agents and peer groups of the agent. Preferably, the PSS 128 provides to agents 132 and one or more peer groups of agents performance statistics such as, for example, in contacts, talk time, work time, total time, available time, aux time, out contacts, out time, system time, and the like. Additionally, the PSS 128 preferably calculates and provides additional performance statistics, such as the average handling time ("AHT"), the average work time ("AWT"), the average talk time ("ATT"), and the like. All of the above statistics and calculations are considered to be well-known to a person of ordinary skill in the art and are discussed in greater detail in the appendix entitled "Statistics Field Specifications," which is incorporated herein for all purposes. The capabilities of the PSS 128 are discussed further below with reference to FIGS. 3–5.

Alternatively, a stand-alone PSS, i.e., such as a PSS separate from the WMS 126 and/or the central processing computer 120, may access the database 122 and provide performance statistics to the agents 132 and supervisors 142. While it is preferred that the PSS 128 be part of the WMS 126, the following discussion is relevant for either embodiment.

The PSS 128 is preferably configurable by the agents 132 and the supervisors 142. Supervisors would preferably be allowed to configure default settings of the PSS 128 and grant access of specific performance statistics to the agents 132. Agents 132 would preferably be allowed to configure the display of the specific parameters and the comparison. One embodiment of the supervisor configuration capabilities is discussed below with reference to FIG. 3, and one embodiment of the agent configuration capabilities is discussed below with reference to FIG. 4.

In accordance with the present invention, contacts (not shown) are received from a telecommunications network (not shown) by the ACD 110 and/or the multimedia server 112, which routes the contacts to an appropriate queue and agent according to internal algorithms. Agents log into the ACD 110 and/or the multimedia server 112 to service the contacts. As agents 132 service the contacts, the ACD 110 and multimedia server 112 periodically, such as every 15–30 minutes or real-time, report contact statistic data to the central processing computer 120, which stores the data in the database 122. Additional performance statistics, such as the averages discussed above, are calculated when the data is requested by the agent 132 and/or supervisor 142. Alternatively, the additional performance statistics are calculated periodically and stored as are the performance statistics reported by the ACD 110 and the multimedia server 112.

The supervisors 142 and the agents 132 may access the PSS 128 executing on the central processing computer 120. Through the PSS 128, the supervisors 142 may allow agents 132 to access specific performance statistics and general display properties. Agents 132 may, through the PSS 128, further configure display properties of the performance statistics to suit their personal tastes.

Figure 2:
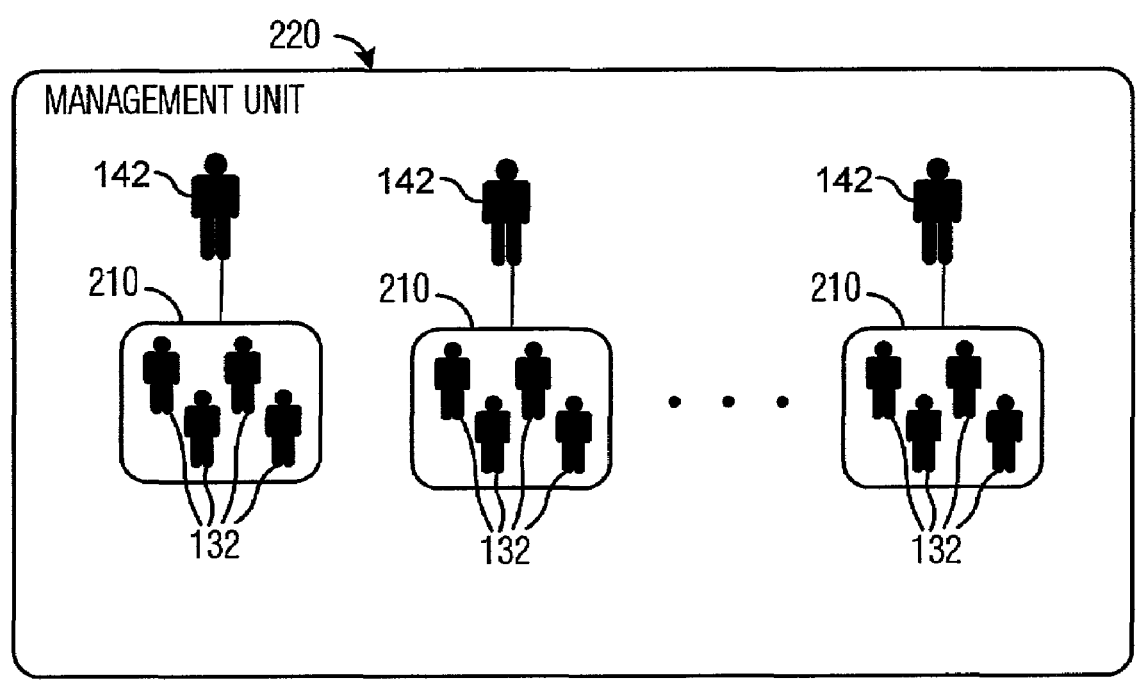
FIG. 2 schematically depicts an organization of agents within a contact center environment.

FIG. 2 illustrates a preferred embodiment of the present invention in which peer groups of the agents 132 constitute agent data groups 210, and multiple agent data groups 210 constitute management units 220. Each agent 132 belongs to one or more agent data groups 210. Preferably, all agents 132 reporting to a particular supervisor are preferably grouped into one agent data group 210. Alternatively, an agent data group 210 may be configured according to the skills, seniority, service priority level, and/or the like, of the agents 132.

One or more agent data groups 210 and the respective supervisors 142 are preferably organized into a management unit (MU) 220. An MU 220 is preferably located at a single location, such as a building, a city, a floor of a building, a department, or the like. Each MU 220 is preferably managed locally as a single unit with its own work rules and hours of operation.

Figure 3A:
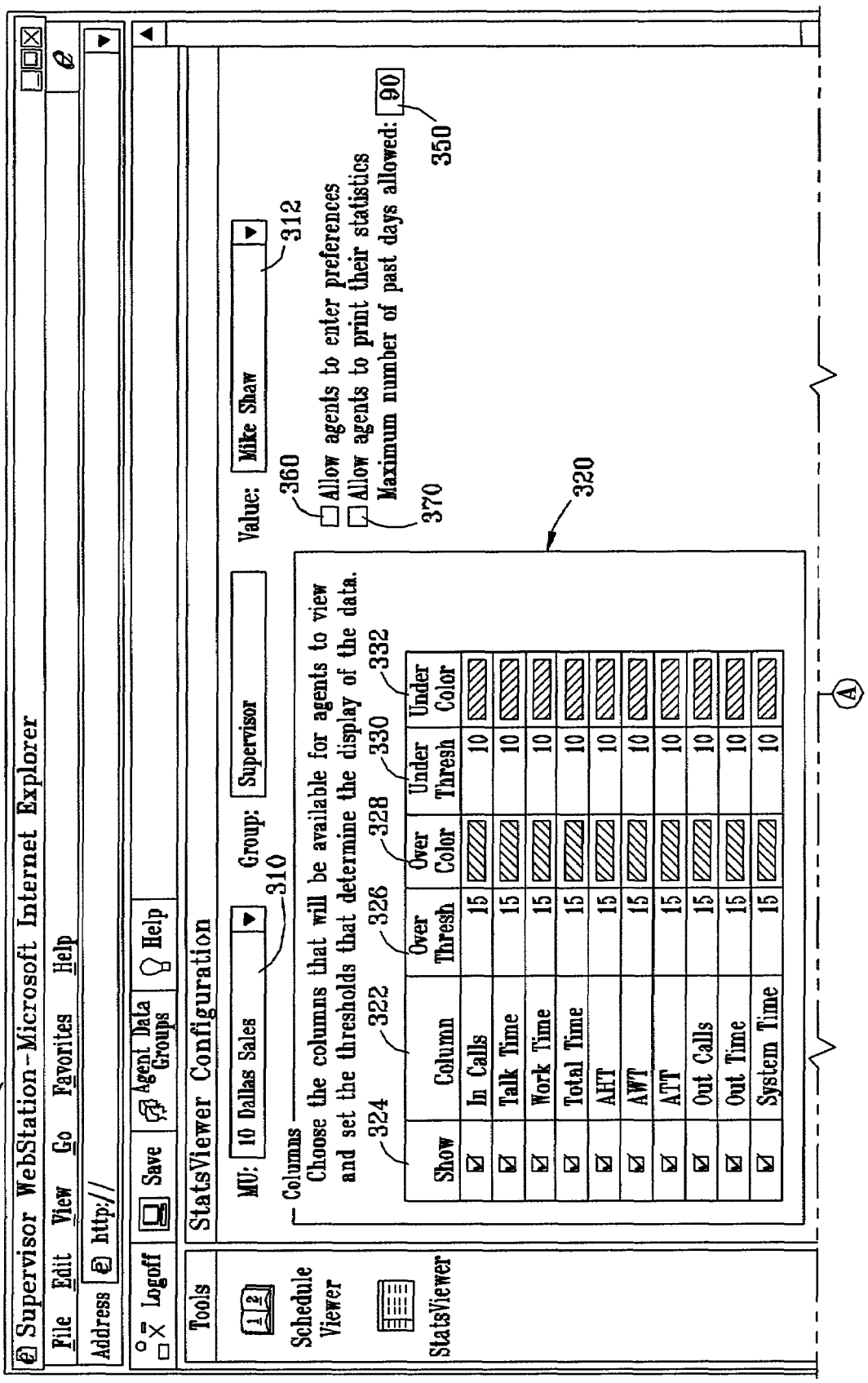
FIGS. 3A–3B illustrate one embodiment in which a supervisor configures a performance management system.
Figure 3B:
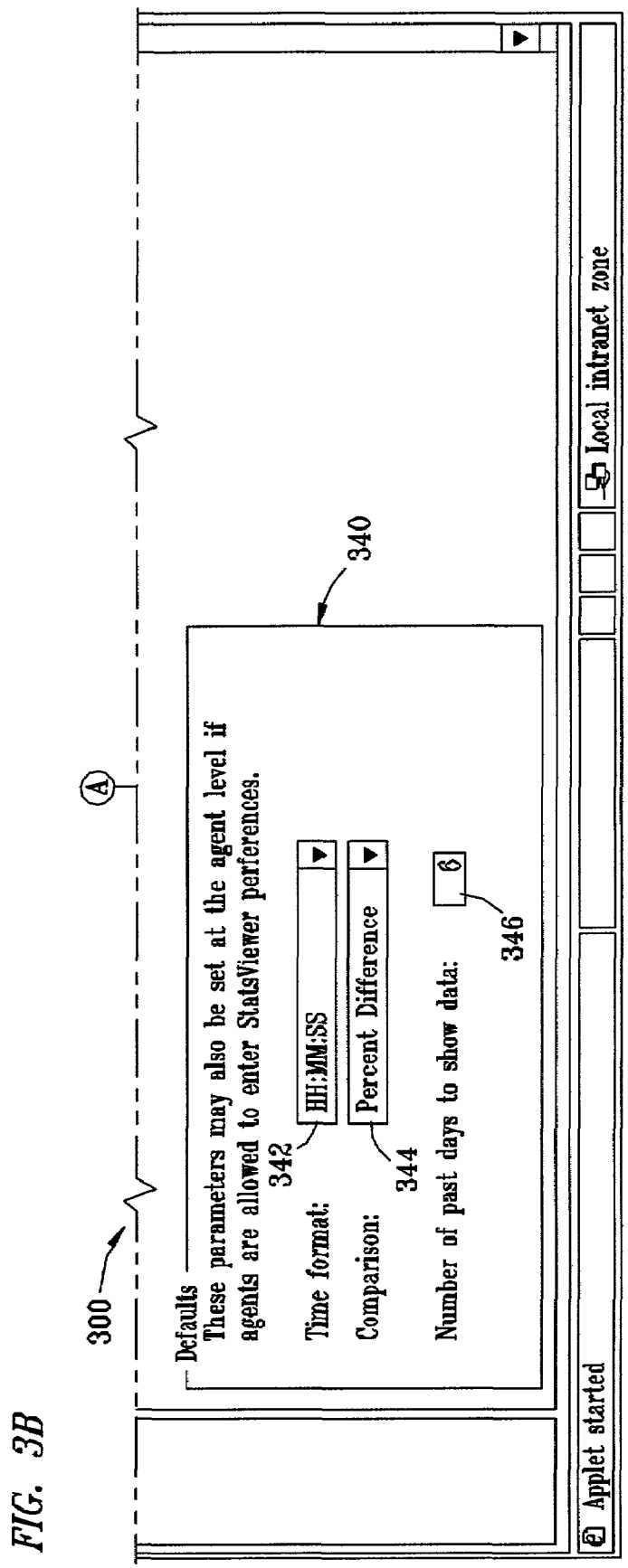

FIGS. 3A–3B illustrate a preferred embodiment of the present invention, which allows a supervisor 142, or other person with appropriate access privileges, to configure the PSS 128. Preferably, access to the PSS 128 is restricted via the use of a logon screen, or a comparable restricted access system. The methods and use of restricting access to a system are considered to be well-known to a person of ordinary skill in the art and, therefore, will not be discussed in greater detail herein.

The reference numeral 300 generally designates a screen shot, which may be generated and displayed on a supervisor workstation 140 (FIG. 1) using a web browser, such as the Microsoft Internet Explorer. Although FIGS. 3A–3B depict a screen shot generated by a web browser, it is preferred that a Java applet is used without a web browser by using WebStart to run programs that require different versions of JAVA. Additionally, other means of generating the screen shot 300 and interfacing with the PSS 128, such as via a textual-based interface, a graphical-based interface, a voice interface, or the like, may be used and are to be included within the scope of the present invention.

The supervisor 142 preferably provides access to specific performance statistics to agents 132 at the supervisory level, i.e., to agents 132 of an agent data group 210, or all agents 132 reporting to a particular supervisor 142. The supervisor 142 selects, preferably from a drop-down selection box 310, an MU 220 (FIG. 2) and a group value 312, the combination of which identifies agents 132 for which the supervisor is able to configure the PSS 128. Preferably, the MU 220 identified in the box 310 is the same MU 220 to which the supervisor 142 belongs, and the group value identified in the box 312 is the name of the supervisor of the group. Alternatively, different groupings of agents may be created. For example, an agent data group may not exist for these purposes and a supervisor may configure the PSS 128 for all agents of the MU 220, or groupings of agents may be created that span across agent data groups 210 and/or MUs 220. The purpose of the MU drop-down box 310 and the group value box 312 is to identify a group of agents 132 to which a user is able to grant access and configure the PSS 128. These alternative groupings are considered to be included within the present invention.

A columns group box 320 enables a supervisor 142 to select specific performance statistics which may be accessed by agents 132 identified by the MU 220 drop down box 310 and the group value 312. The performance statistics, listed in the column field 322, preferably comprise the in contacts, the talk time, the work time, the total time, the AHT, the AWT, the ATT, the out calls, the out time, and the system time. Optionally, additional performance statistics, such as available time, aux time, and the like, may be included in the column field 322. The supervisor 142 controls access to the performance statistics by selecting/deselecting the show checkbox 324. If the show checkbox 324 is selected, the agent 132 may view the value of the respective performance statistic. If the show checkbox 324 is deselected, however, the agent 132 is prevented from viewing the respective performance statistic.

Preferably, the supervisor 142 is also allowed to configure the appearance of each performance statistic on the performance report display (discussed below with reference to FIG. 5) by defining over and under threshold values, 326 and 330, respectively, and over and under threshold colors, 328 and 332, respectively. The over threshold value 326 represents the value at which if the value of a performance statistic of the agent 132 is greater than the respective performance statistic value of a peer group, and the percentage difference between the respective performance statistic value of the agent 132 and the respective performance statistic value of a peer group is greater than the over threshold value 326, then the respective performance statistic value of the peer group will be displayed in the color indicated by the over threshold color 328. Similarly, the under threshold value 330 represents the value at which if a performance statistic value of the agent 132 is less than the respective performance statistic value of a peer group, and the percentage difference between the performance statistic value of the agent 132 and the respective performance statistic value of the peer group is less than the under threshold value 330, then the respective performance statistic value of the peer group will be displayed in the color indicated by the under threshold color 332.

For example, if the over threshold value 326 is 15 and the under threshold value 330 is 10, and the average number of in contacts for all agents 132 in an agent data group 210 is 100, then the average number of in contacts for the agent data group 210 will be displayed in the over threshold color 326 if the number of in contacts for the agent 132 is over 115 (100+(15%*100)=115), and the average number of in contacts for the agent data group 210 will be displayed in the under threshold color 322 if the number of in contacts for the agent 132 is under 90 (100−(10%*100)=90). As an alternative to colors, different fonts, such as Arial, Times Roman, and the like, different font characteristics, such as italicizing, reverse printing, bolding, underlining, and the like, different background patterns, such as shading, cross-hatching, diagonal lines, horizontal/vertical lines, and the like, or other notification systems, such as pop-up windows, sounds, and the like, may be used to indicate the above conditions.

Alternatively, the over threshold value 326 and the under threshold value 330 may be an explicit value range for each performance statistic. For example, in the above example the over threshold value 326 may be entered as 115 and the under threshold value 330 may be entered as 90.

Preferably, a defaults group box 340 allows the supervisor to specify default values for the agents 132 identified by the MU 220 drop down box 310 and the group value 312. The default values preferably comprise the time format 342 for presentation, a comparison method 344, and the number of past days to present in a performance comparison report 346. Preferably, the choices for the time format 332 comprise standard HH:MM:SS, HH:MM:SS.S, HH:MM:SS.SS, MMMM:SS, MMMM:SS.S, MMMM:SS.SS, SSSSSS, SSSSSS.S, and SSSSSS.SS formats, where "H" represents hours, "M" represents minutes, and "S" represents seconds, including tenths and hundredths of seconds in some formats as shown above.

The comparison method 344 identifies the method used to compare an agent 132 to the peer groups of the agent 132 for purposes of presenting the performance comparison report to the agent 132. Preferably, the alternatives for the comparison method 344 comprise none (no comparison), difference, and percent difference. If none is selected, the performance statistic values presented will comprise the average value for all agents 132 of the peer group. If difference is selected as the comparison method 344, then the respective parameter value presented will comprise the performance statistic value of the agent 132 less the respective performance statistic value of the peer group. If percent difference is selected as the comparison method 344, then the value displayed is the percent difference between the performance statistic value of the agent 132 and the respective performance statistic value of the peer group, relative to the peer group. In other words, the value presented for the respective performance statistic of a peer group is the quotient of the performance statistic value of the agent 132 less the respective performance statistic value of the peer group, divided by the respective performance statistic value of the peer group. Preferably, a minus sign will be presented preceding the value to indicate negative results if either the difference method or the percent difference method is selected.

The "Number of past days to show data" field 346 specifies the number of days to include in the performance comparison report. The agent 132 is preferably allowed to modify the number of days, as specified below with reference to the "Number of past days to show data" field 426 of FIG. 4, up to the "Maximum number of past days allowed" field 350.

Preferably, the supervisor 142 is also able to grant agents 132 identified by the MU 220 drop down box 310 and the group value 312 the ability to modify the preferences and to print the comparison report. The supervisor 142 grants agents 132 the ability to modify the preferences by selecting the "Allow agents to enter preferences" option box 360. If the "Allow agents to enter preferences" option box 360 is selected, then the agents 132 identified by the MU 220 drop down box 310 and the group value 312 are allowed to alter the preferences as indicated in the discussion below with reference to FIG. 4. If, however, the "Allow agents to enter preferences" option box 360 is not selected, then the agents 132 identified by the MU 220 drop down box 310 and the group value 312 are prohibited from altering the preferences set by the supervisor 142.

The supervisor 142 grants the agents 132 the ability to print the performance comparison report by selecting the "Allow agents to print their statistics" box 370. If the "Allow agents to print their statistics" box 370 is selected, then the agents 132 identified by the MU 220 drop down box 310 and the group value 312 are allowed to print the performance comparison report. If, however, the "Allow agents to print their statistics" box 370 is not selected, then the agents 132 identified by the MU 220 drop down box 310 and the group value 312 are prohibited from printing the performance comparison report.

Figure 4:
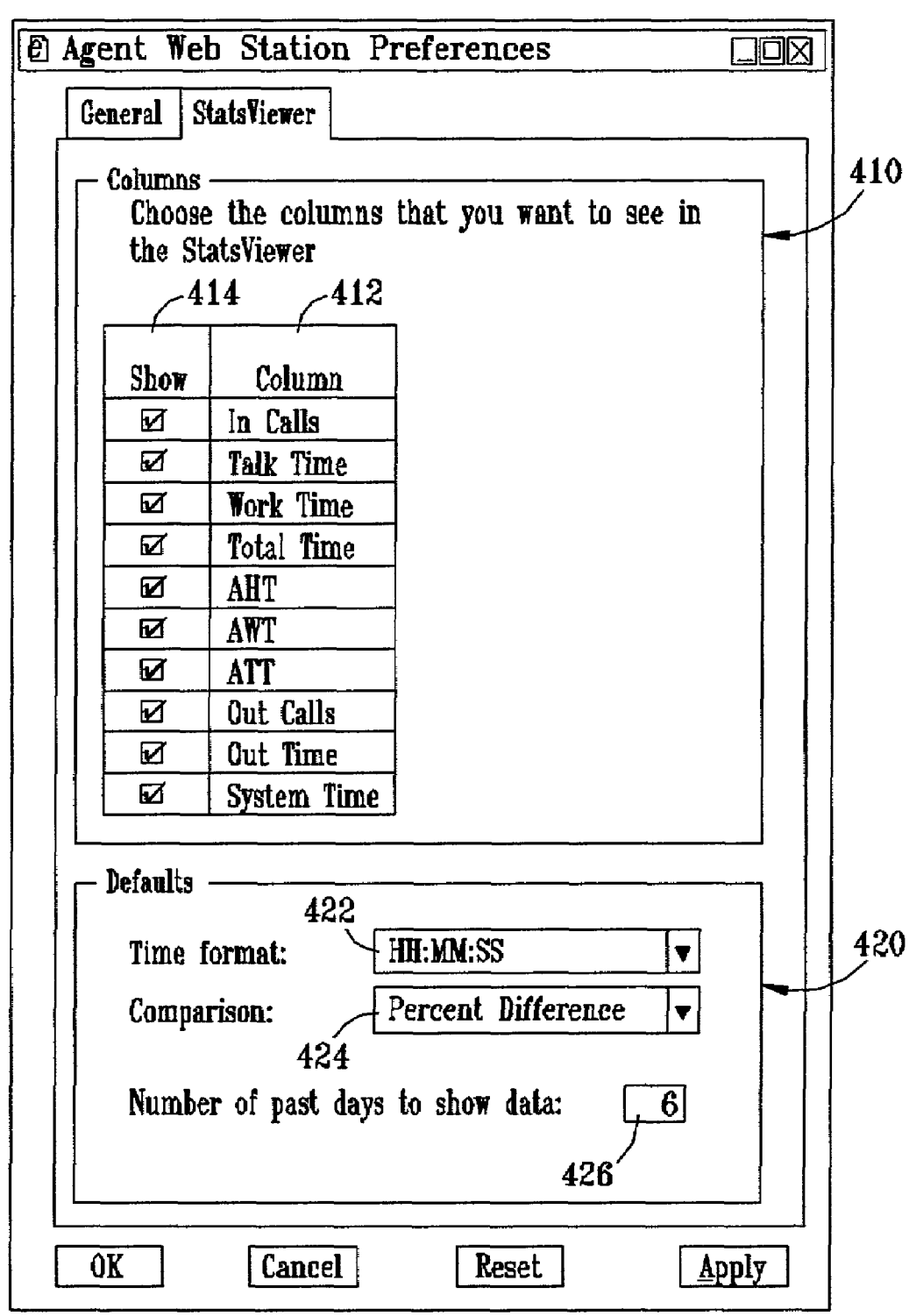
FIG. 4 illustrates one embodiment in which the agent configures the performance management system.

FIG. 4 illustrates one embodiment of the present invention, which allows an agent 132 to configure performance comparison reports via a respective agent workstation 130. Specifically, FIG. 4 is one embodiment in which the agent 132 may configure the display of performance statistics if the supervisor 142 of the agent 132 granted access to the agent 132 by selecting the "Allow agents to enter preferences" checkbox 360 (FIG. 3).

Reference numeral 400 generally designates a screen shot of a web browser, such as the Microsoft Internet Explorer, effective for accessing an agent configuration screen in accordance with the present invention. The agent configuration screen, however, is preferably accessed via a Java applet using WebStart. Preferably, access to the agent configuration screen is restricted via the use of a logon screen, or a comparable restricted access system. The methods and use of restricting access is considered to be well-known to a person of ordinary skill in the art and, therefore, will not be discussed in greater detail herein.

The agent configuration screen 400 preferably comprises a columns group box 410 and a defaults group box 420. The columns group box 410 comprises performance statistics that the supervisor 142 has granted access to the agent 132, via the "Allow agents to enter preferences" checkbox 360 discussed above with reference to the supervisor configuration (FIG. 3). The agent 132 may select or deselect the show checkbox 414 to control the display of the performance statistics listed in the columns 412 that the agent 132 desires, and is a subset of the parameters selected by the supervisor 142 as described above with respect to FIG. 3. The performance statistics in column 412 and the functionality of the show checkbox 414 are similar to that described above with respect to the column 322 and the show checkbox 324, respectively, of FIG. 3.

The defaults group box 420 allows the agent 132 to specify the desired time format 422, the comparison method 424, and the "Number of past days to show data" field 426. The preferred functionality of the time format field 422 and the comparison field 424 are similar to that described above with respect to the time format field 342 and the comparison field 344 of FIG. 3.

The "Number of past days to show data" field 426 allows the agent 132 to specify the number of days the agent 132 wishes to have performance comparisons displayed. Preferably, the agent 132 is allowed to view past days up to the number of days indicated in the "Maximum number of past days allowed" field 350 (FIG. 3).

Figure 5A:
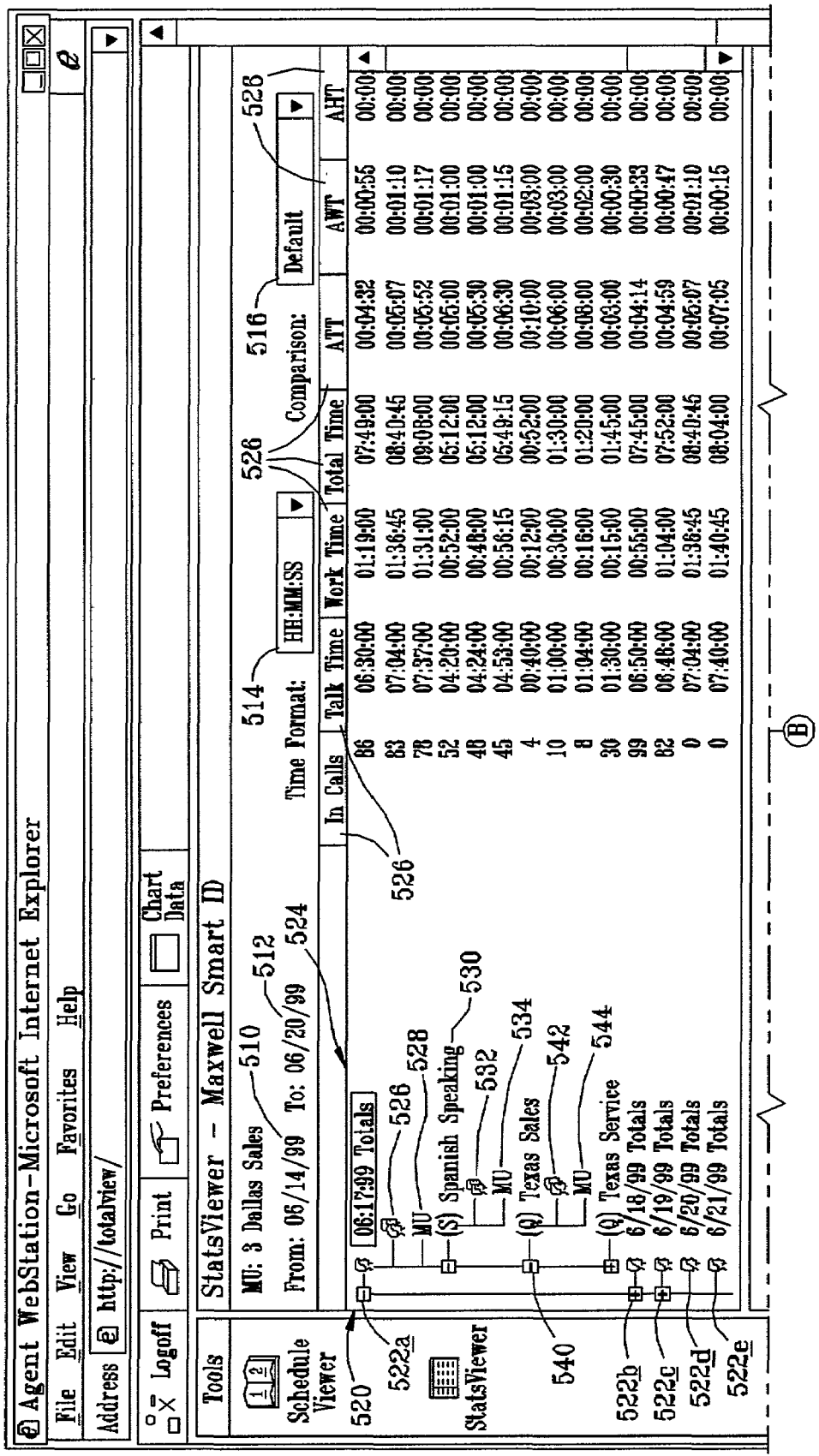
FIGS. 5A–5B illustrate one embodiment in which performance statistics are presented to the agent.
Figure 5B:
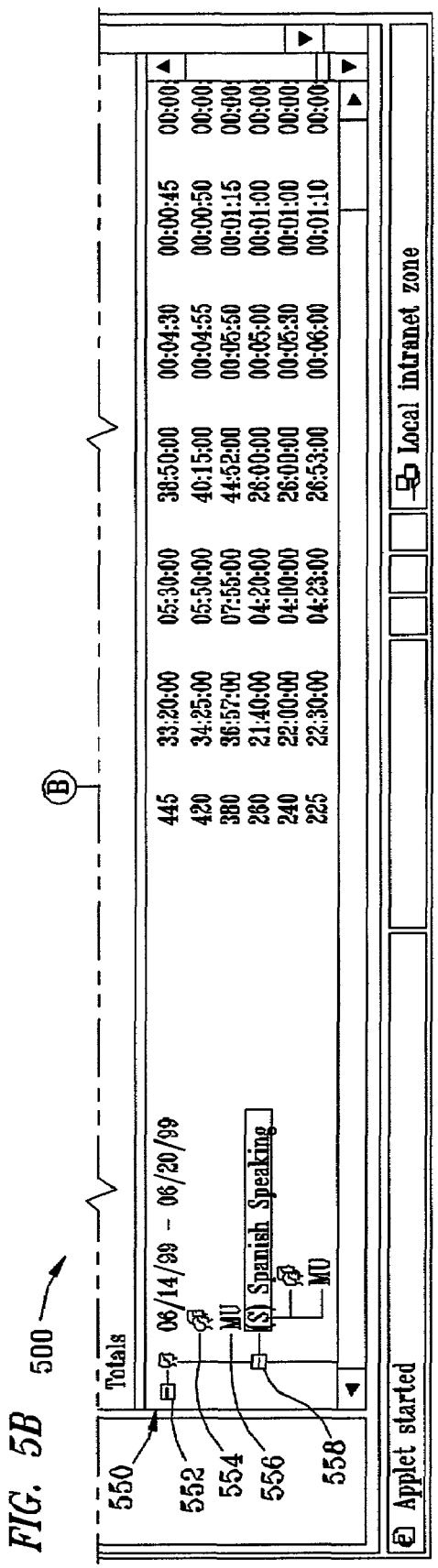

FIGS. 5A–5B illustrate one embodiment of the present invention in which a performance comparison report is displayed to an agent 132, a supervisor 142, and/or other authorized person on a respective agent workstation 130 and/or supervisor workstation 140. Reference numeral 500 generally designates a screen shot of a web browser, such as the Microsoft Internet Explorer, effective for accessing a performance comparison report for an agent 132. The performance comparison report, however, is preferably accessed via a Java applet using WebStart. While the illustrated and preferred embodiment of the present invention comprises a primarily textual comparison report, a comparison report may be generated that includes graphical reports, such as a bar chart, a line chart, and the like, and/or multimedia, including audio and the like. Moreover, the agent 132, supervisor 142, or other authorized user may optionally customize the type of presentation they desired.

In addition to the time format and comparison default fields discussed above with respect to FIGS. 3A, 3B, and 4 (see time format fields 342 and 422, respectively, and the comparison method fields 344 and 424, respectively), the accessing agent 132 preferably also has the ability to modify the time format 514 and the comparison method 516 when viewing the performance comparison report. The functions of both of these fields are as described in the referenced sections pertaining to FIGS. 3A, 3B, and 4, and therefore, will not be discussed in greater detail.

The performance comparison report preferably comprises two sections, a daily totals section 520 and a summary section 550. The presentation of the performance statistics utilize the graphical user interface (GUI) explosion (+) and contraction (−) techniques, and utilize vertical and horizontal scroll bars as necessary, all of which are commonly known to a person of ordinary skill in the art and, therefore, will not be discussed in greater detail.

Each of the daily totals section 520 and the summary section 550 comprise a day/group column 524 and one or more performance statistics columns 526. The day/group column 524 represents the day and group to which the values of the performance statistics presented in the one or more performance statistics columns 526 pertain.

The day/group indicated in column 524 preferably comprises the agent 132 (FIG. 1), the agent data group 210 (FIG. 2), and the MU 220 (FIG. 2). The performance statistics of the agent 132 are contained in the total rows indicated by an icon comprising a single head as shown in the daily total lines 522a–e, and/or by the daily skill total rows 530 and the daily queue total rows 540. Preferably, the daily skill totals are indicated by an "[S]" as illustrated in the daily skill total row 530, and the daily queue totals are indicated by a "[Q]" as illustrated in the daily queue total row 540. Values for the performance statistics 526 of the agent 132 are preferably displayed in a bold font.

The agent data group 210 is preferably indicated by an icon comprising two heads, as illustrated in daily totals 526, 532, and 542. The MU 220 is preferably indicated by "MU", as illustrated in the daily totals 528, 534, and 544. The values for the performance statistics 526 of the agent data group 210 and the MU 220 are preferably presented in a non-bold font colored as described above in reference to the over threshold value 326, over threshold color 328, under threshold value 330, and under threshold color 332 of FIG. 3.

The daily totals section 520 comprises one or more daily total rows 522a–522e for each date from the from date 510 to the to date 512, of which daily total row 522a is shown in an exploded state, daily total rows 522b–522c are shown in a contracted state, and daily total rows 522d–522e are shown in an empty state, possibly indicating the agent did not work the date shown. Each daily total row 522a–522e preferably expands to present daily totals for an agent data group 526 and an MU 528. Optionally, also presented are one or more daily skill totals 530 and/or one or more daily queue totals 540. The daily skill total 530 presents the performance statistics 526 for the agent 132. The daily skill total 530, such as the ability to handle Spanish-speaking calls (illustrated), product and/or problem type, and the like, preferably expands to present the daily skill total of the agent data group 532 and/or the daily skill total of the MU 534.

Likewise, the daily queue total 540 presents the performance statistic 526 for the agent 132. The daily queue total 540, such as the contacts handled from the Texas Sales queue (illustrated), Texas Service queue (illustrated), and the like, preferably expands to present the daily queue total of the agent data group 542 and the daily queue total of the MU 544.

The summary section 550 comprises the total performance statistics summarized from the from date 510 to the to date 512. Preferably, the performance statistics are displayed for each agent 552, agent data group 554, MU 556, skill and/or queue 558. Alternatively, the performance statistics may comprise of a subset of the groupings discussed above and/or comprise of additional groupings that a user desires. The format and the content of rows within the summary section 550 are equivalent to the daily total section 520 discussed above, except that the values of the performance statistics 526 are calculated over the entire date range from the from date 510 to the to date 512.

It is understood that the present invention can take many forms and embodiments. Accordingly, several variations may be made in the foregoing without departing from the spirit or the scope of the invention. For example, additional performance statistics, such as schedule adherence, state adherence, agent conformance, agent sales, agent revenue, agent attendance, entitlement adherence, quality scores, and the like, additional groupings, varying display formats, such as graphical display (e.g., bar charts) instead of textual display, and the like, are considered within the spirit and/or the scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A workforce management method for measuring contact center agent performance, wherein contact center agents are organized into groups, and wherein the agents in each group report to a supervisor, comprising:
   receiving data that measures performance of the contact center agents;
   processing the performance data to:
   (1) measure a given agent in the contact center according to data received on the given agent's performance handling calls according to a set of performance metrics that comprise: in calls, talk time, work time, total time, average handling time, average wait time, average talk time, out calls, out time and system time;
   (2) selectably configure the display of the given agent's performance by a supervisor, wherein the supervisor selects one or any combination of the performance metrics that will be displayed to the given agent;
   (3) configure the display of individual performance metrics each to display a comparison of an individual performance metric to an under threshold or an over threshold to indicate the individual performance metric in relation to the under threshold or over threshold;
   (4) configure the display to show a comparison of the given agent to other agents in the group, the comparison being one of: no difference, a difference or a percent difference;
   (5) further configure the display to show a number of past days of performance data for the comparison; and
   (6) display the performance data for the given agent for the number of past days of performance data configured by one or more views that include: on a cumulative basis across all skills and call types, according to a given skill that the given agent possesses, and according to a given call type handled by the given agent.

2. The method of claim 1 wherein the step of processing the performance data further comprises selecting at least one presentation characteristic of a performance metric, the at least one presentation characteristic having at least an over threshold indicator including at least one of colors, fonts, italicizing, reverse printing, bolding, underlining, background patterns, shading, cross-hatching, diagonal lines, horizontal lines, vertical lines, pop-up windows, and sounds.

3. The method of claim 1, wherein the step of processing the performance data further comprises selecting at least one presentation characteristic of a performance metric, the at least one presentation characteristic having at least an under threshold indicator including at least one of colors, fonts, italicizing, reverse printing, bolding, underlining, background patterns, shading, cross-hatching, diagonal lines, horizontal lines, vertical lines, pop-up windows, and sounds.

4. The method of claim 1, further comprising the step of collecting and updating the performance data periodically.

5. The method of claim 1, wherein the given agent is performing in at least one of a call center, a contact center, a sales force center, a field service center, and a factory.

6. The method of claim 1, further comprising the step of allowing the given agent to enter display preferences, the display preferences comprising at least one of a performance metric, a time format, a comparison method, and a number of past days to show data.

7. The method of claim 6, wherein the comparison method comprises at least one of no difference, difference, and percent difference.

8. The method of claim 1, further comprising the step of allowing the given agent to select a form of communication of a performance data, the form comprising at least one of a textual display, a graphical display, a bar chart, a line chart, audio, and multimedia.

9. The method of claim 1, further comprising the step of allowing a supervisor to select a form of communication of a performance data, the form comprising at least one of a textual display, a graphical display, a bar chart, a line chart, audio, and multimedia.

10. The method as described in claim 1, wherein one or more agent groups comprise one or more management units, and wherein the performance data are displayable for the given agent and the one or more other agents in the agent's group and management unit.

11. The method as described in claim 1, further including the step of displaying the given agent's performance data relative to the performance data for one or more other agents in the agent's group and management unit for each of two or more daily periods within the number of past days of performance data configured.

12. The method as described in claim 1, further including the step of displaying the given agent's performance statistic data relative to the performance data for one or more other agents in the agent's group and management unit for an aggregate number of daily periods within the given time period.

13. The method as described in claim 1, wherein the views are represented in a hierarchy.

14. The method as described in claim 1 further including configuring an appearance of given performance data for the given agent.

15. The method as described in claim 1 further including configuring an appearance of given performance data for the one or more other agents in the agent's group.

16. The method as described in claim 15 wherein the appearance of the performance data for the one or more other agents in the agent's group is configured as a function of a value of the performance data with respect to the value of the performance data of the given agent.

* * * * *